Oct. 4, 1938.  F. RITZ  2,131,970
PISTON RING CONSTRUCTION
Filed March 9, 1936
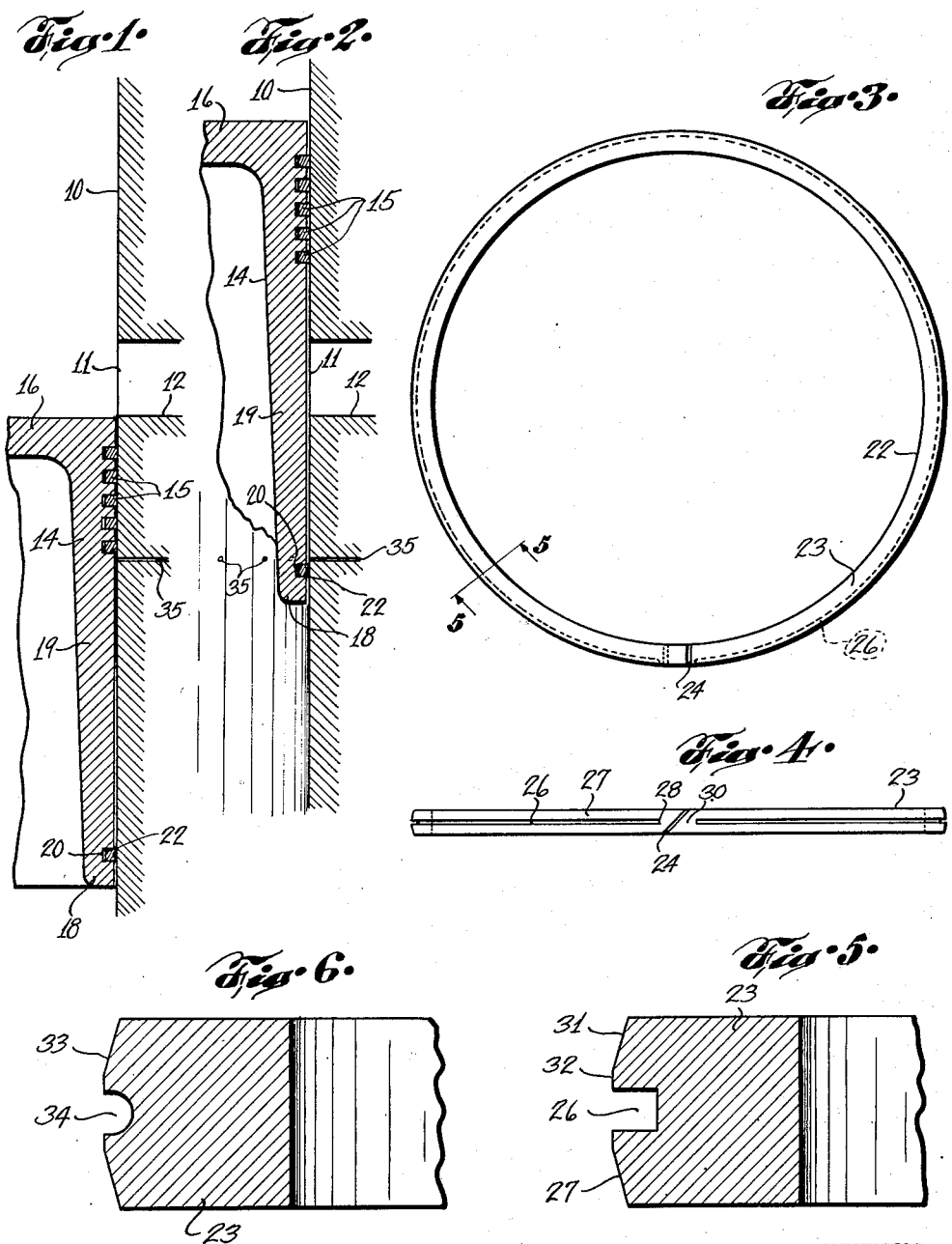
INVENTOR.
FREDERICK RITZ
BY
Roy M. Tilew
ATTORNEY.

Patented Oct. 4, 1938

2,131,970

UNITED STATES PATENT OFFICE 2,131,970

PISTON RING CONSTRUCTION

Frederick Ritz, Hamilton, Ohio, assignor to Fairbanks, Morse & Co., Chicago, Ill., a corporation of Illinois Application March 9, 1936, Serial No. 67,878

3 Claims. (Cl. 309—45)

This invention relates to improvements in piston ring construction and arrangement, particularly relating to rings for internal combustion engines and the like, and in its broader aspects covering an improved lubricating device adapted for distributing lubricant over the piston bearing surfaces in the cylinder of an internal combustion engine.

An object of the present invention is attained in the provision of a greatly improved lubricant distributing device in a piston assembly, adapted for distributing lubricant over the cylinder bearing surfaces, whereby to effect a positive and uniform lubrication of the cylinder walls.

Another object may be found in the provision of a novel ring arrangement in a piston assembly, which, in addition to a function as a lubricant distributor, is designed to provide a fluid seal between the piston and cylinder, whereby to prevent lubricant from being pumped into the combustion chamber and cylinder ports, as a result of the pumping action of the piston rings.

A further object is attained in the provision of an improved lubricant distributing means in a piston assembly, which is characterized by a ring element having a closed-end groove in the peripheral surface of the ring, with the circumferential axis of the groove in the centerplane of the ring element.

A still further object may be found in the provision of an improved lubricant distributing device arranged in the piston assembly, which, in addition to attaining the foregoing objects, serves in the operation of the piston, as a lubricant collector device of the oil scraper type.

Yet another object is to be found in the provision of an improved lubricant controlling device which is readily adaptable to the piston assembly of an engine of the trunk-piston, two-cycle type, for effecting a uniform and positive lubrication of the piston bearing surfaces of the cylinder, the device so effectively serving this purpose as to enable the engine to be operated with greater efficiency and at a substantially lower rate of lubricant feed.

Further objects and advantages will appear from the following description and from the drawing, in which:

Fig. 1 is a fragmentary longitudinal sectional elevation of a cylinder and piston assembly embodying the improved features of the present invention, the piston in this instance being shown as disposed, relative to the cylinder and ports, at one end of its stroke; Fig. 2 is a view similar to that of Fig. 1, but with the piston disposed at the opposite end of its stroke; Fig. 3 is a plan or top view of a presently preferred form of lubricant collecting and distributing ring, incorporating certain features of this invention; Fig. 4 is a lateral elevation of the ring appearing in Fig. 3; Fig. 5 is an enlarged transverse sectional elevation of a portion of the device, as viewed from line 5—5 in Fig. 3, and Fig. 6 is a view similar to that of Fig. 5, but showing a slight modification in the oil-collecting features of the ring.

Referring now to the drawing by suitable characters of reference, the numeral 10 denotes a portion of a cylinder wall of an internal combustion engine, the wall being provided with a suitable exhaust port 11 and passage 12 communicating with the port. A piston 14, only a part of which is shown, is arranged to operate in the cylinder 10, the piston being provided in the usual manner, with piston packing ring elements 15 which, in the present example, are located adjacent the piston head or crown 16.

The lubricant collecting and distributing arrangement constituting the principal improvement of the present invention, importantly includes a ring now to be described, which is, by preference, arranged in the lower end portion 18 of the piston skirt 19. An annular groove 20 is formed in the peripheral surface of the skirt end 18, the groove serving as a seat for the oil distributing and control ring which is designated, generally, by the reference character 22 (Fig. 3). The device 22 is comprised of a ring element 23 of substantially rectangular section, as shown in Fig. 5, the ring being provided with a diagonal ring-gap 24 suitably located therein for purposes of ready assembly of the ring to the piston skirt and seat 20. A relatively shallow groove 26 is formed in the outer peripheral surface 27 of the ring element, the groove serving as a lubricant-receiving pocket for a purpose which will be hereinafter more fully described. The groove is, by preference, substantially co-extensive with the circumference of the ring, the ends 28 of the groove however being closed adjacent the ring-gap 24, as by land portions 30 intervening the ends of the groove and the ring-gap. Furthermore, the arrangement of the groove in the outer peripheral surface of the ring is such that the circumferential axis of the groove is in the centerplane of the ring element. Thus it will be observed that the ring element is provided with a closed groove or pocket which is open only on its outer peripheral side. The shallowness of the groove relative to the sectional dimensions of the ring is such as to preclude any material weakening of the ring structure. The shape of the groove in cross section may be rectangular, as illustrated by Fig. 5, or it may be semi-circular as shown in Fig. 6. However, the groove may be given any other sectional aspect desired. Moreover, instead of the groove extending uninterruptedly from one closed end 28 to the opposite end thereof, it may be divided into a number of separate, closed pockets distributed circumferentially of the ring element. For this purpose, land elements (not shown) may be formed in suitably spaced relation, in the groove.

A further feature of the ring element resides in the form and shape of the circumferential surface 27 of the ring. As is preferred in the present example, a portion of the surface between the groove 26 and each edge of the ring is bevelled, as at 31 in Fig. 5. The remaining surface portions 32 adjacent to and serving to define the marginal edges of the groove 26, are by preference, disposed to lie in a plane which is at a right angle to a transverse axis of the ring element. However, the surface 27 may be formed in any shape desired, keeping in mind, of course, the manner in which the ring element is to be disposed in the piston structure, and its operative relation to the cylinder walls. As will be hereinafter more fully described, the marginal wall portions 32 serve, in the operation of the piston, as lubricant scraper elements having as their function to scrape excess lubricant from the cylinder walls and to deliver such lubricant to the groove 26.

The somewhat modified ring structure illustrated by Fig. 6 may have its outer peripheral surface 33 formed in a manner similar to that of the peripheral surface 27 of the ring element shown in Fig. 5. As above intimated, the lubricant-receiving groove 34 provided in the modified ring structure is, by preference, of semi-circular sectional aspect.

As a means for supplying lubricant to the cylinder walls and to the groove 26 in the distributing ring element 23, a portion of the cylinder wall below the exhaust port 11 is provided with lubricant feed ducts 35, a plurality of which are suitably spaced and angularly distributed about the cylinder, the ducts being supplied with lubricant from any suitable source (not shown). It is preferred to supply the feed ducts from a positive pressure source, such as a multi-plunger lubricator, which, since it may be of conventional construction, is not illustrated. The location of the distributor ring 23 in the piston skirt and the disposition of the lubricant feed ducts 35 in the cylinder walls are such that the ducts are always interposed between the distributor ring 23 and the compression ring 15 nearest the head 16, throughout the piston travel. The arrangement of parts as last described is provided in order to prevent a direct flow of lubricant from the feed ducts 35 into the combustion chamber when the piston is in its lower dead-center position, or into the crankcase when the piston reaches its upper dead-center position. Moreover, as clearly appears from Fig. 2, the piston skirt is by preference, of such axial length that the lubricant distributor ring 23 carried in the lower end of the skirt will be disposed considerably below the exhaust ports 11 when the piston is in its upper dead-center position, thus avoiding an exposure of the distributor ring and the lubricant carried thereby to the hot zone of the exhaust ports.

In the operation of the engine, lubricant is fed through the ducts 35 to the internal wall surfaces of the cylinder. As the piston reciprocates in the cylinder, the scraper surfaces or edges 32 of the distributor ring 23, scrape or collect lubricant from the cylinder walls and deliver the lubricant to the groove or channel 26 in the ring. In normal operation, the groove 26 will be completely filled with lubricant, and since the groove extends substantially circumferentially of the piston, the body of lubricant carried by the ring 23 will supply lubricant to any cylinder wall areas which might otherwise be inadequately oiled. Likewise, since the ring 23 is carried by the reciprocating piston, lubricant will be distributed longitudinally of the cylinder, to all parts of the cylinder bearing surfaces. Thus the lubricant-carrying ring element 23 will effect a positive and even distribution of lubricant over substantially the whole of the piston bearing surface in the cylinder structure.

In addition to the foregoing, the distributor ring element 23 serves to provide, through the body of lubricant carried thereby, a fluid seal between the piston and cylinder. Thus there is effectively prevented any tendency for the piston compression rings to pump lubricant past the piston and into the combustion space in the head end of the cylinder. Moreover, it is to be understood that the distributor ring element may be employed to equal advantage in the piston assembly of an engine utilizing the "splash" method of piston lubrication, instead of the direct delivery of lubricant through suitable ducts in the cylinder wall, as by the ducts 35 in the cylinder wall 10 shown in Figs. 1 and 2. In this case, the lubricant deposited on the lower internal portions of the cylinder walls would be collected by the scraper edges 32 of the distributor ring and delivered to the ring groove 26, for ultimate distribution to those surface areas of the cylinder which are insufficiently lubricated.

It has been found in practice, that when the improved lubricant distributing device of the present invention is employed in the piston structure of an engine of two-cycle trunk-piston type, such for example, as a Diesel engine, the lubrication and sealing of the piston in the cylinder are enhanced to a degree to result in a marked reduction in the engine lubricant consumption. This same result is found to obtain in noticeable degree, when the presently described lubricant distributing ring is applied to internal combustion engines of other types, as well.

While in the foregoing description and claims the terms "upper" and "lower" are employed for convenience of description, this terminology is not to restrict the application of the invention to a vertical engine, since it is equally adaptable to engines of horizontal type, or those having the cylinder or cylinders located at any operative angle.

It is to be understood that the invention is not limited solely to the presently described embodiment thereof, but that substantial alterations and modifications may be made therein without departing from the spirit and full intended scope of the invention, as defined by appended claims.

I claim:

1. A one-piece piston ring of split type having a circumferentially extending groove formed centrally of its wearing face, the groove being closed on its sides and bottom and at its ends adjacent the split portion of the ring, the upper and lower marginal edges of the ring being bevelled from points adjacent the groove, in a direction rearwardly of the wearing face, to provide well defined lubricant scraper edges adjacent the groove, adapted for collecting and delivering lubricant to said groove throughout movement of said piston.

2. A one-piece piston ring characterized by a split forming a joint, the outer or wearing face of the ring having a central groove of perimetral trend, closed at its ends adjacent the split and open only on the wearing face, the groove being adapted for the collection and distribution of oil, the depth of the groove being uniform and relatively small in proportion to the lateral depth of the ring, and the ring being bevelled from points on each side of the groove, rearwardly of the ring wearing face and toward the upper and lower marginal edges, to provide well defined scraper edges adjacent the groove.

3. A one-piece piston ring characterized by a joint and provided with a perimetral groove of uniform depth and arranged centrally of its wearing face, the groove being out of communication with the joint and open only on the wearing face, the median portion of the wearing face of the ring lying along the margins of the groove constituting a zone of substantially cylindrical form, and the ring being bevelled inwardly, in a direction radially of the ring, from said zone to its upper and lower margins, to provide well defined scraper edges marginally of the groove.

FREDERICK RITZ.